Apr. 17, 1923.  1,451,684

H. CUMMER

WEIGHING SCALE

Filed Feb. 11, 1921

Inventor:
Harry Cummer
John Powers
Atty

Patented Apr. 17, 1923.

1,451,684

UNITED STATES PATENT OFFICE.

HARRY CUMMER, OF BUFFALO, NEW YORK.

WEIGHING SCALE.

Application filed February 11, 1921. Serial No. 444,269.

*To all whom it may concern:*

Be it known that HARRY CUMMER, a citizen of the United States, residing at Buffalo, in the county of Erie and State of New York, has invented certain new and useful Improvements in Weighing Scales, of which the following is a specification.

This invention relates to improvements in weighing scales of the type disclosed in my prior United States Patents, Nos. 1,076,486 of October 21, 1913, and 1,185,634 of June 6, 1916. Such type is essentially characterized by rocker beams in parallel planes and by the provision on one or more of the beams of a series of bearing points, the beams tilting from point to point and ultimately coming to rest on two adjacent bearing points of the series.

This type of scale while useful generally for the purpose of commercial weighing is especially adapted to the weighing of postal matter for the reasons that it is self-acting, that it gives a quick and certain registry of the weight of the article on the scale pan and that it may readily be made to operate on a small "excess." This "excess," as it is called, is the fraction of weight over and above the prescribed unit of weight which is required to tip the beam of an ordinary balance scale, such as is commonly used for weighing postal material.

The invention is directed to the construction of the rocker beam and the associated bearing points and consists in novel details of structure and organization which serve the essential objects of insuring the engagement of the bearing points with the supporting surface along lines normal to the longitudinal plane of the beam, of providing said points on projections of great intrinsic strength which is not affected by the mutual spacing of the points, of virtually eliminating wear on the bearing points, of maintaining the mutual operative alinement of said points, of increasing the strength and rigidity of the beam and of increasing the sensitiveness of action. Such objects insure the accuracy of the scale, its long efficient life, the permanence of its accuracy and the reduction to a minimum degree of the "excess" weight necessary to register a full unit of weight consistent with the postal requirements according to which fractions of units, e. g., ounces as in domestic postal service, are charged for as full units.

The invention is illustrated in the accompanying drawings, wherein.

Figure 1:
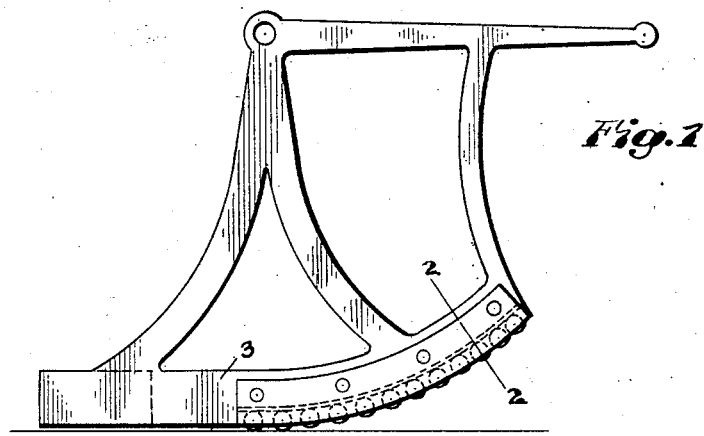
Figure 1 is a side elevation of a rocker beam.
Figure 2:
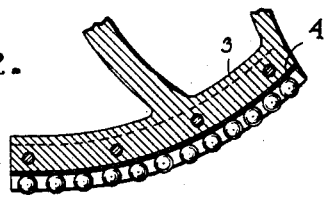
Figure 2 is a detail cross section on the line 2—2 of Figure 1 showing the arrangement of the bearing points.

According to the invention the bearing points are provided by structurally independent bodies and are preferably "ball" points. By the term "ball point" is meant a point in a circle or other regular convex curve lying in the plane of the beam in contradistinction to the sharp spur or knife-edge points disclosed in my prior patents. These ball points are preferably provided either by a series of balls 1 as in Figures 1-3 or by a series of discs 2, as in Figures 4-6, which balls or discs are examples of structurally independent bodies within the scope of the invention and are of hardened steel or other suitable material and have the advantage of being substantially wear-proof at their engaging points. The ball points provide the tread of the beam and, of course, lie in the proper curve for the tread. The structurally independent bodies have the advantages of being capable of production with great accuracy and with requisite hardness and of being adapted for any mutual spacing that may be necessary in a particular case.

Figure 3:
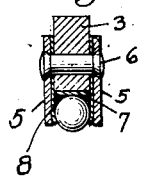
Figure 3 is a detail longitudinal section of the same.

The rocker beam is provided with a tread portion 3 whose underface conforms to the curvature of the tread and forms the base of a channel in which the balls 1 are arranged. A suitable wear-strip 4 may be fitted against the underface of the tread portion 3 to take the wear of the balls 1, the strip 4 preferably being of hardened steel. The channel for the balls 1 is completed by side plates 5 which are secured to the tread portion 3 by rivets 6 or otherwise suitably. As fitted in the channel the balls 1 are retained by thin plates 7 of suitable resilient metal whose outer edge portions are inturned as shown in Figure 3, thereby gripping the balls and constricting the mouth of the channel in order that the balls 1 may project but may not fall out. The plates 7 are arranged between the plates 5 and the tread portion 3 and are also secured by the rivets 6; and the plates 5 are relatively stiff and heavy as compared with the plates 7 and provide extensive and rigid bearings for the plates 7 as well as reinforcing the tread portion and insuring that the channel shall have the requisite strength.

The balls 1 are arranged and rigidly held at suitable intervals in the channel from end to end thereof and may be secured by means of suitable cement 8 as shown in Figure 3 or in any other suitable manner.

Figure 4:
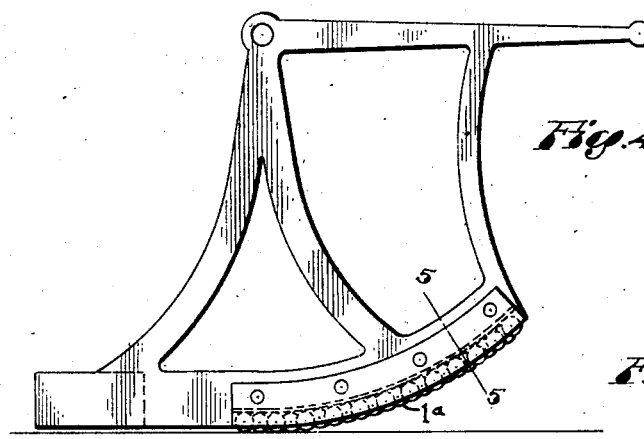
Figure 4 is a side elevation of a rocker beam having ball points of modified construction.
Figure 6:
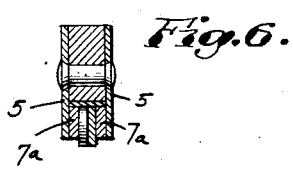
Figure 6 is a detail longitudinal section of the modified construction.
Figure 5:
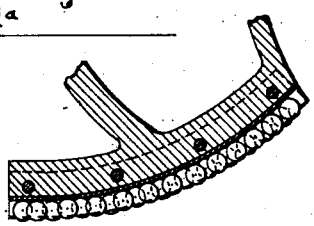
Figure 5 is a detail cross section on the line 5—5 of Figure 4 showing a modified or alternative construction.

Referring to Figures 4-6:

These figures show the arrangement of the discs 2 which, in comparison with the balls 1, have the advantage of enabling the bearing points to be arranged at much closer intervals, as may be necessitated by particular circumstances and requirements of use.

Where the discs 2 are employed they are preferably arranged in parallel rows, their planes coinciding with the longitudinal planes of the tread portion and the discs of one row overlapping the adjoining discs of the other row. Instead of the plates 7 used for the retention of the balls 1, filler strips 7ª may be provided to take up the space between the discs and the plates 5. As in the previous embodiment the discs may be held at appropriate intervals by suitable cement.

The invention is not concerned with the structural details of the scale, such as the supporting base, the scale pan and the indicating mechanism and therefore such details are not illustrated. It may be noted that a rocker beam of the general type shown in Figure 6 of my Patent No. 1,185,634 has been selected for illustration merely by way of example.

Having fully described my invention, I claim:

1. In a weighing scale of the type which includes a rocker beam, a series of structurally independent bodies carried by said beam and arranged along the tread thereof, said bodies providing ball points on which the beam may tip.

2. In a weighing scale of the type which includes a rocker beam, a channel conforming to the tread of said beam and structurally independent bodies fitted in and projecting beyond said channel, said bodies providing ball points on which the beam may tip.

3. In a weighing scale of the type which includes a rocker beam having a convex tread, a series of structurally independent bodies carried by said beam and channel means for supporting said bodies along said convex tread, said bodies providing bearing points on which the beam may tip.

4. In a weighing scale of the type which includes a rocker beam, a series of projections along and conforming to the tread of said beam and providing ball points on which the beam may tip.

In testimony whereof I affix my signature.

HARRY CUMMER.